Figure 11:
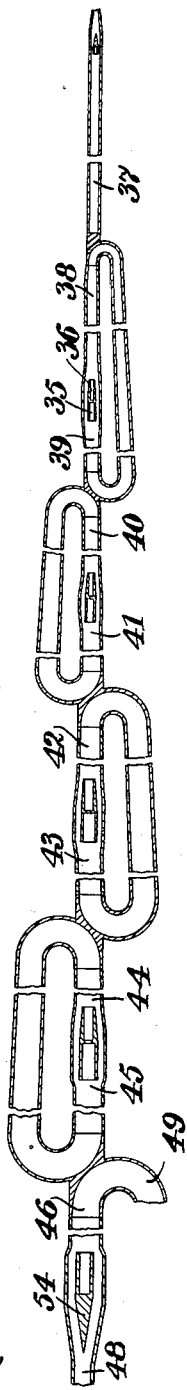

J. A. HART.
MEANS FOR IMPARTING ENERGY FROM ONE BODY OF GASEOUS FLUID TO ANOTHER AND THE UTILIZATION OF THE RESULTING PRODUCT.
APPLICATION FILED MAY 4, 1912.
1,131,511.
Patented Mar. 9, 1915.
5 SHEETS—SHEET 1.
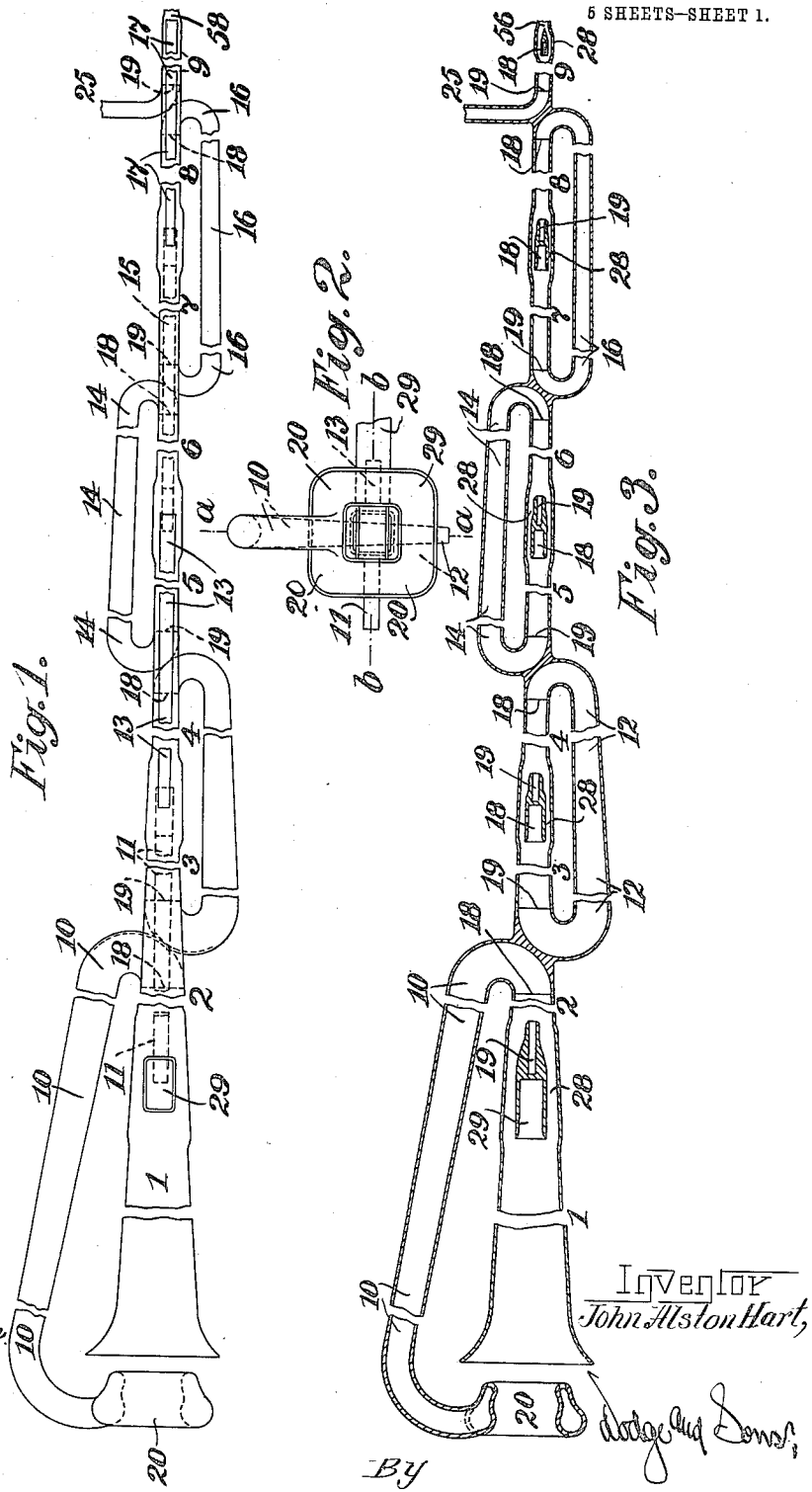

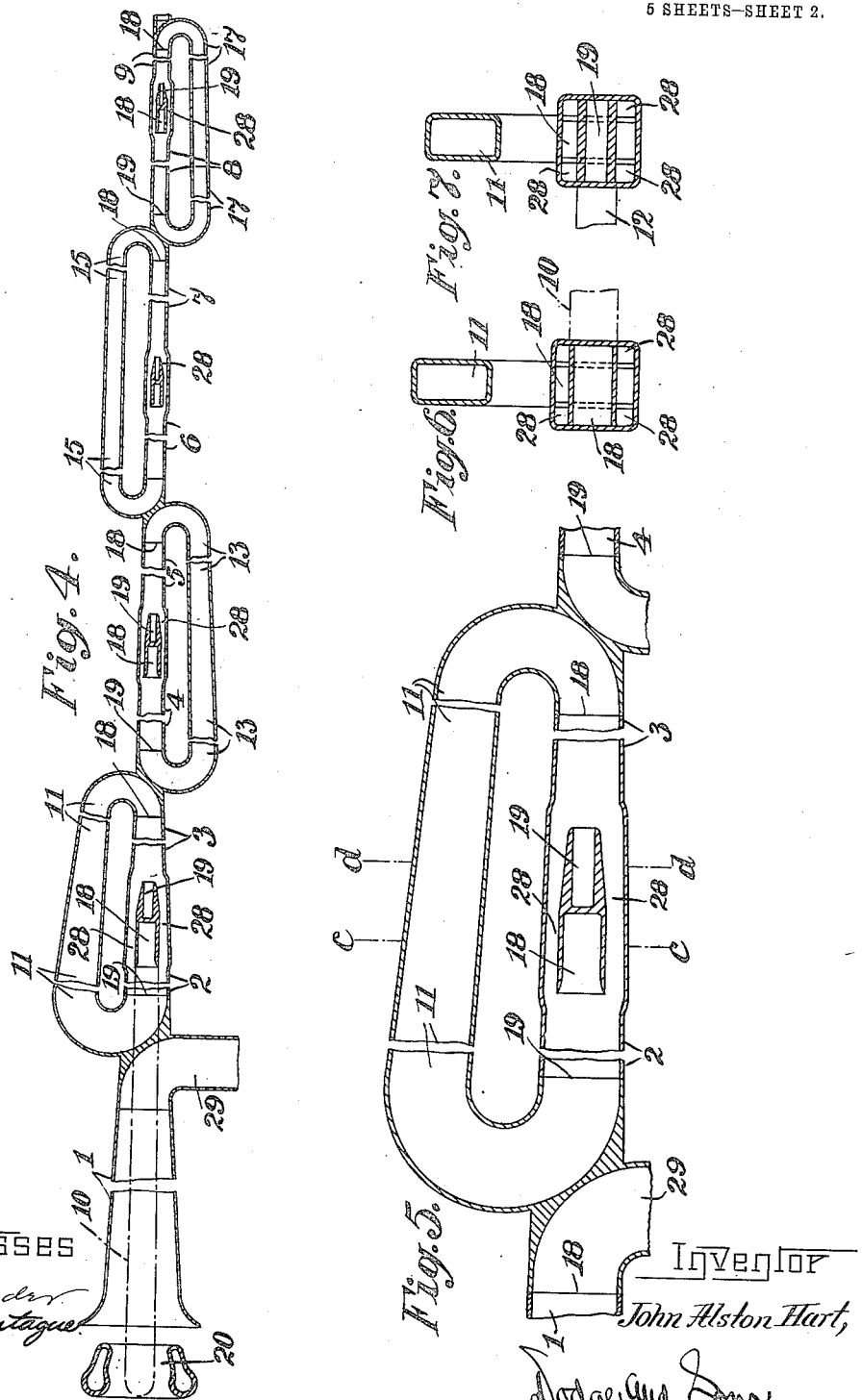

J. A. HART.
MEANS FOR IMPARTING ENERGY FROM ONE BODY OF GASEOUS FLUID TO ANOTHER AND THE UTILIZATION OF THE RESULTING PRODUCT.
APPLICATION FILED MAY 4, 1912.
1,131,511.
Patented Mar. 9, 1915.
5 SHEETS—SHEET 3.
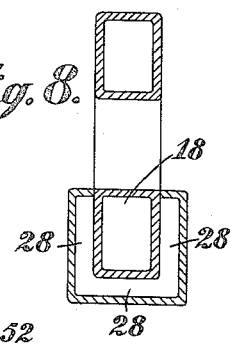
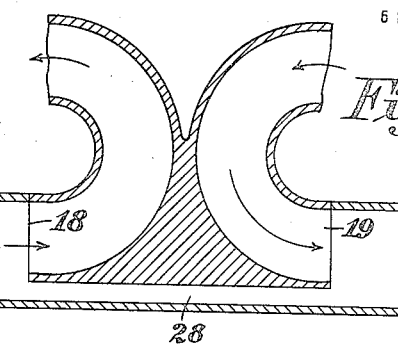
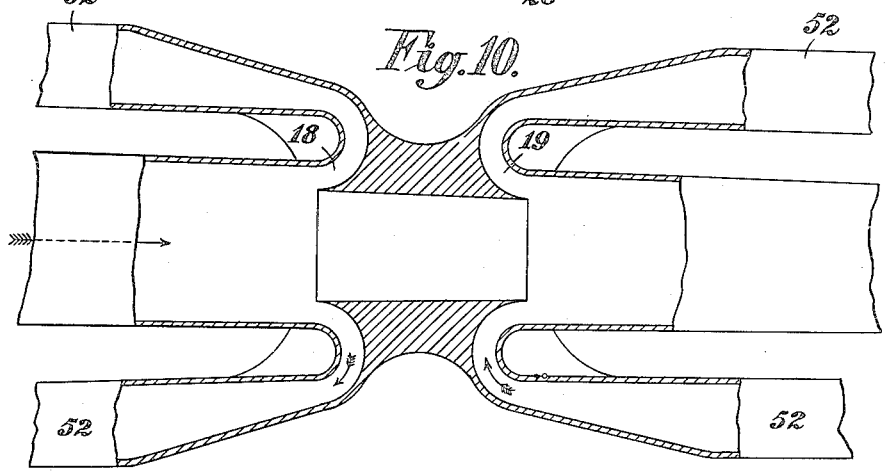

J. A. HART.
MEANS FOR IMPARTING ENERGY FROM ONE BODY OF GASEOUS FLUID TO ANOTHER AND THE UTILIZATION OF THE RESULTING PRODUCT.
APPLICATION FILED MAY 4, 1912.

1,131,511.

Patented Mar. 9, 1915.
5 SHEETS—SHEET 4.

Witnesses

Inventor
John Alston Hart,
By Dodge and Sons,
Attorneys.

J. A. HART.
MEANS FOR IMPARTING ENERGY FROM ONE BODY OF GASEOUS FLUID TO ANOTHER AND THE UTILIZATION OF THE RESULTING PRODUCT.
APPLICATION FILED MAY 4, 1912.

1,131,511.

Patented Mar. 9, 1915.
5 SHEETS—SHEET 5.

Witnesses

Inventor
John Alston Hart,
By Dodge and Dows,
Associate Attorneys.

UNITED STATES PATENT OFFICE.

JOHN A. HART, OF BLACKBURN, ENGLAND.

MEANS FOR IMPARTING ENERGY FROM ONE BODY OF GASEOUS FLUID TO ANOTHER AND THE UTILIZATION OF THE RESULTING PRODUCT.

1,131,511. Specification of Letters Patent. Patented Mar. 9, 1915.

Application filed May 4, 1912. Serial No. 695,298.

*To all whom it may concern:*

Be it known that I, JOHN ALSTON HART, a subject of the King of Great Britain, residing at Blackburn, in the county of Lancaster, in the Kingdom of England, have invented certain new and useful improvements in and connected with means for imparting energy from one body of gaseous fluid to another and the utilization of the resulting product, of which the following is a specification.

This invention relates to means for imparting energy from one body of gaseous fluid to another and to the utilization of the resulting body or bodies of fluid.

The apparatus employed is of the type in which injector action taking place in a plurality of successive stages is employed for the purpose of obtaining the interaction between the two bodies of gaseous fluid.

It has been proposed to utilize, for the purpose of compressing gas, apparatus consisting of a number of injectors and combining chambers arranged in series and connected by side pipes so that part of the combined stream from one stage is carried to another stage to serve as the driving or driven stream in the injector of that stage. This previously proposed apparatus was intended for use either for the purpose of producing a relatively large quantity of gas of relatively low pressure or a relatively small quantity at a higher pressure, the gas being led off from the lowest pressure stage in the former case and from the highest pressure stage in the latter case.

Apparatus working with gaseous fluid on the multi-stage injector principle above indicated, depends for its action on the bringing together of two streams of gas at each stage, accompanied by the transfer of energy from one stream to the other, and the subsequent division of the combined stream of gas into two parts and the removal of one of these streams for re-introduction to the system at another stage. Throughout the action each stream is serving as a carrier of energy and if the action is to be satisfactory each stream must be handled in such a manner as to minimize the giving up of energy by it except at those parts of the system where it is desired that the transfer should take place, that is where two streams unite and flow together, and at these parts the conditions should be such as to facilitate the transference with the minimum of loss or dissipation of the energy dealt with.

Although it has been recognized that when dealing with two bodies of gaseous fluid it is desirable to carry out the transference of energy gradually, that is, in a number of stages, it has been assumed that in other respects the form of injector such as is used as a steam injector for supplying boiler feed-water, or for like purposes, is equally applicable to the altered circumstances. Now it is well known that the mechanical efficiency of a steam injector acting upon a liquid is very low, but, owing to the condensation of the steam by the liquid in the combining tube, heat is transferred to the liquid and this is a desirable result in the special circumstances in which such an appliance is used, the heating effect counter-balancing the disadvantage of the low mechanical efficiency. In the case of one stream of gaseous fluid acting upon another, quite different circumstances exist as compared with the case just mentioned, and where the resulting gas is to be used for the production of mechanical power, for instance, in a turbine or reciprocating engine, it is extremely desirable to transfer the energy to that gas by processes which do not diminish the availability of the energy for the performance of mechanical work.

It is well known that the impact of two streams of gas results in loss of kinetic energy, the action being exactly analogous in this respect to the impact of inelastic solid bodies, that is, of bodies in which the coefficient of restitution has zero value. This circumstance has been taken into consideration in producing the present invention, and in accordance with this invention one stream of gas is caused to act upon the other in such a way as to avoid as much impact action between the two streams as possible, these streams, during their interaction, flowing through the combining chamber in parallel paths. There is accordingly contact between the two streams on their adjacent surface or surfaces and the energy is transferred across these surfaces mainly by mutual interpenetration of the individual particles of the two streams and frictional engagement between these streams.

In order to obtain a satisfactory interaction of the two streams of gas and to avoid, as far as possible, degradation of energy in the apparatus, steps are taken to so form the combining chambers and the passages leading thereto and therefrom that irregularities of flow are, as far as possible, prevented, this result being obtained by avoiding sudden changes in the section or direction of the passages and sudden changes in the shapes of the bodies in which the inlet and outlet passages are formed.

It is evident that the aspect of the invention from the point of view above indicated may be described as the application to a multi-stage injector apparatus, working by the interaction of gaseous fluids, of means for more efficiently effecting the transfers of energy which takes place in the stages. The improved apparatus also provides for the production and delivery of the resulting body of gaseous fluid at conditions of energy per unit weight intermediate between the conditions of the highest and lowest stages. For instance, the apparatus may be supplied with a body of high pressure gas and may take in a larger body at a comparatively low pressure, such as that of the atmosphere, while the body of gas that is delivered may be at an intermediate pressure.

The compressed gases can be employed for any required purpose, for example, for driving turbines, or other engines, or in refrigerating machines, after being cooled, or for producing vacuum in vacuum brakes, or the like.

Although in the above example only pressure has been mentioned, it is to be understood that apparatus constructed in accordance with this invention also deals with energy manifested in other ways, such as by temperature and velocity.

The application of multi-stage injector apparatus to the preparation of charges for internal combustion engines and for combustion chambers is also comprised in the part of the invention which relates to the utilization of the gaseous bodies forming the output of the injector apparatus.

The invention will be further described with reference to the accompanying drawings. in which—

Figure 12:
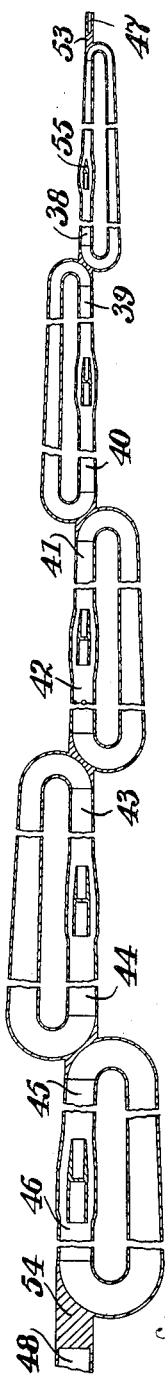
Figure 13:
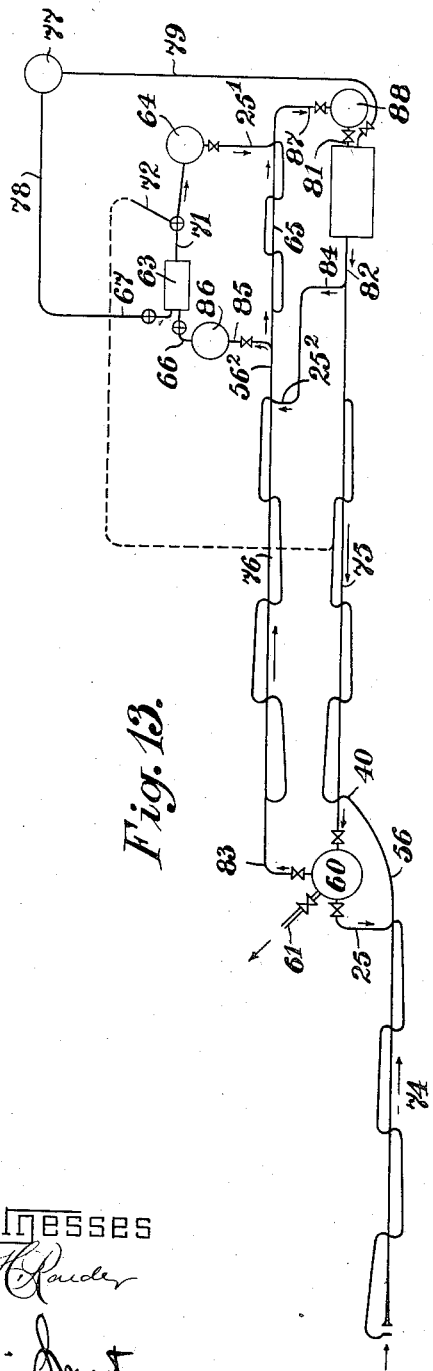
Figure 14:
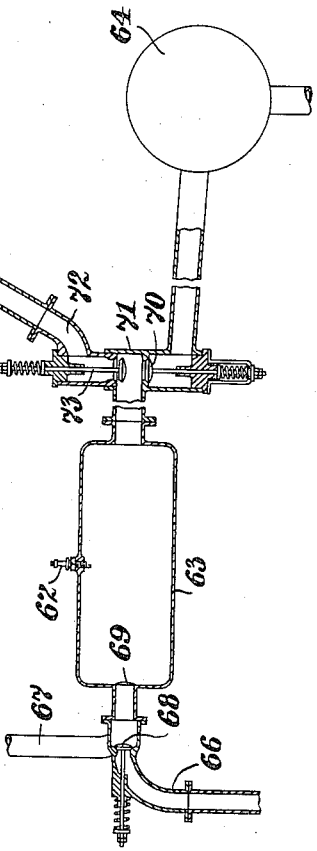

Figure 1 represents one form of the apparatus in elevation. Fig. 2 is an end view of this apparatus, and Figs. 3 and 4 are longitudinal sections on the lines $a$—$a$ and $b$—$b$ respectively of Fig. 2. Fig. 5 is an enlarged sectional view of part of the apparatus shown in Fig. 1, the section being on the same plane as Fig. 4, and Figs. 6 and 7 are transverse sections on the line $c$—$c$ and $d$—$d$ of Fig. 5 respectively. Figs. 8 and 9 are sections at right angles to each other showing a modified form of the outlets and inlets to the chambers of the apparatus. Fig. 10 is a longitudinal section of a further modification. Figs. 11 and 12 are longitudinal sections in planes at right angles to each other of a second form of the apparatus. Fig. 13 is a diagram of an installation combining injector apparatus and combustion chambers. Fig. 14 shows, on a larger scale, some of the features connected with the arrangement of one of the combustion chambers.

It will be understood that all the figures of the drawings are diagrammatic.

The arrangement illustrated in Figs. 1 to 7 is intended for use where it is desired to impart energy to a relatively small body of gas, the resulting product being a body of gas having a condition of energy per unit weight not far removed from the condition of the initial gas. The arrangement illustrated in Figs. 11 and 12 applies to the case in which a relatively large body of gas of relatively small energy per unit weight is to be produced. By a combination of the two types of apparatus it is possible to obtain an output of a body of gas intermediate in condition between the products obtainable with either form of apparatus used alone. This particular combination will be further described hereinafter.

In each stage of the apparatus there are two streams of gas, one acting as the driving stream and the other as the driven stream, the driving stream serving to impart energy to the driven stream. These terms "driving stream" and "driven stream" will be used hereinafter with the meaning just indicated, it being understood that the body of gas forming the driving stream in one stage is not necessarily the same as the body which forms the driving stream in another stage, and similarly the driven stream in one stage is not necessarily the same as the driven stream in another stage.

In the form of apparatus illustrated in Figs. 1 to 5, the initial driving stream which is in the condition of having relatively high energy per unit weight, enters by way of the passage 25 and is discharged into the apparatus by the nozzle 19 at the right hand end of Figs. 1, 3 and 4. The body of gas which is to be acted upon in the apparatus, enters by way of the chamber 1 at the left hand end of the apparatus shown in Figs. 1, 3 and 4. The resulting gaseous body leaves the apparatus at the outlet 56 beyond the end of the chamber 9 at the right hand end of the apparatus.

The chambers in which the gases are acted upon in successive stages are marked 1 to 9 in order. The pipes by which a portion of the stream of gas in each chamber is carried back to act as the driving gas in a preceding chamber are marked 10 to 17 in order. The openings or nozzles by which the streams of gas pass back into the main chambers from the side pipes are marked 19 and the passages by which the gases pass to the side pipes are marked 18. The lengths of the chambers 1 to 9 are not indicated in the drawings. It will be understood, however, that these lengths must be such as to permit of the desired interaction of the combined streams of gases taking place therein.

The operation of this form of the apparatus is as follows: The initial driving stream enters by the nozzle 19 at the right hand end of the apparatus as previously indicated. Adjacent to this nozzle is a body of gas resulting from the actions in the previous stages of the apparatus, which body of gas acts as the driven stream and receives energy from the entering stream. A portion of the resulting gas enters the passage 18 at the right hand end of the apparatus and passes to the side pipe 17. The remainder of the combined stream passes to the outlet 56 beyond the end of the chamber 9. The portion of gas which flows through the side pipe 17 flows into the left hand end of the chamber 8 and there acts as the driving stream in that stage, acting upon the driven stream which has resulted from the action in the preceding chamber indicated by 7. A part of the combined stream from chamber 8 passes by way of the passage 18 at the right hand end of that chamber to the side pipe 16 and is carried back by this pipe to act as the driving stream in chamber 7. A similar action takes place in each of the lower stages until chamber 1 is reached. In this chamber the gas entering from the outside source, for instance from the atmosphere, is acted upon by a nozzle illustrated as of ring form and numbered 20. The combined stream of gas flows through chamber 1 in which a passage such as 29 may be provided to carry a portion of the stream of gas to the exhaust. The remainder flows to the second stage serving as the driven stream in chamber 2.

It will be seen from the preceding description that the general path of the gas through the apparatus is from the chamber 1 to the chamber 9. It will also be seen from the drawings that with the arrangement shown the main path of the gas follows a straight line. Although generally it is advantageous to have the straight line arrangement of the chambers from the point of view of efficiency, it may happen that in some cases space can be economized without a great reduction of efficiency by disposing the general path of the flow of the gases along a curved line; for instance the whole apparatus may be arranged so that the general path of the gas through it is in the form of a spiral, either flat or cylindrical.

Each outlet passage 18 is arranged so that at the point at which the stream of gas enters it the general direction of flow of this stream in the passage is parallel or approximately parallel with the direction of flow in the chamber from which the gas has been taken, so that no disturbance of the flow of the stream takes place at this point. Similar relations exist between the incoming driving streams and the driven streams at the points at which they come together. These relations have for their object to produce the conditions for efficient action discussed in the opening part of this specification.

The openings into the passage 18 are of the size necessary to allow of the flowing through them of the required quantity of the gases, and there is a space or spaces 28 alongside of the walls of the passage 18 to permit the remainder of the stream to pass on to the next chamber. It will be generally preferable to arrange the inlet passages 18 and the outlet nozzles 19 back to back, for instance, as clearly shown in Fig. 5, and to form the walls of these passages so that they unite to produce a single body of smooth external form without any abrupt projections or recesses which would produce irregularities in the flow of the streams past them. Fig. 5 also clearly shows that the end portions of the passages 18 and 19 which are located in the chambers are parallel with the direction of flow in the adjacent parts of the chambers, the walls of these passages having been continued into the chambers slightly beyond the points at which the curves become tangential to the adjacent parts of the chamber walls.

As illustrated in Figs. 6 and 7, the passages 18 and 19 are of approximately rectangular form with rounded corners and are arranged so as to extend across the central portion of the chambers in which they are located. Each of the passages 18 with the adjacent passage 19 is preferably arranged so as to extend across the chamber on an axis at right angles to the axis along which the preceding and succeeding passages 18 and 19 lie. This arrangement is also illustrated in Figs. 6 and 7. It will be seen that it provides for facilitating intimate intermingling of the driving and driven streams, since the stream taken out from each chamber flows from some parts of the chamber which are not directly opposite any part of the inlet nozzle at the other end of the chamber. Also each passage 18 is so disposed, in this arrangement, as to receive part of both the driven and driving streams which come into the opposite end of the combining chamber.

If the alternative arrangement illustrated in Figs. 8 and 9 be used, the driving stream of the gas entering through the nozzle 19 is surrounded on three sides by the driven stream instead of on two sides as in the case of Figs. 6 and 7. Although this arrangement is not so symmetrical as that previously described, it may be found that for other reasons it is, in some cases, desirable to utilize it. This form may also be modified so that the inlet and outlet passages extend the whole way across, the chambers leaving spaces between them and the chamber walls on two sides only.

In the arrangement illustrated in Fig. 10 construction somewhat similar to that of Figs. 8 and 9 is used, but instead of having the inlet and outlet passages formed in a projection from one side of the chamber these passages are formed so as to each extend all around the chamber, a central space being left for the main stream of gas to pass through. Each side of each of the annular chambers 18 and 19 is preferably connected with a tube 52. Each of the annular chambers could be connected with a single tube but it appears that two tubes are preferable from the point of view of avoiding abrupt changes in the direction of flow. In any case the tube or tubes of one stage must be of such dimensions and so disposed that they do not obstruct the path of the tube or tubes of the next stage. For instance, if a single tube is used forming a continuation of the annular passage, it must not extend more than half way around the chamber. It is not necessary, although it appears desirable, that any part of the walls of the passages 18 and 19 should extend into the chambers. The outlets and inlets might be arranged as apertures in the walls of the chambers leading to passages which are at their entrances approximately parallel with the direction of flow of the gases in the chambers adjacent the apertures. With such an arrangement the wall of the chamber would be deflected inward opposite the outlet aperture so as to provide for the necessary decrease in the area of the chamber at the point where the gas leaves, and there would be a corresponding enlargement of the section of the chamber at the point opposite the inlet aperture.

The arrangement shown in Figs. 11 and 12 resembles that shown in Figs. 3 and 4 in that it consists of a series of combining chambers of different areas of cross section arranged in order from the smallest to the largest (indicated by the numbers from 37 to 46), these chambers having inlet and outlet passages at opposite ends, which passages connect with side pipes disposed so as to interconnect the different stages of the apparatus. The passages which conduct the gas from the side pipes into the combining chambers are indicated by 35 and the passages leading from the combining chambers to the side pipes are indicated by 36. In this apparatus the initial driving stream, having a high condition of energy per unit weight, enters by a passage 47 at the right hand end of the apparatus, and passes into the combining chamber 37 of smallest area of cross-section, being directed toward the end of the chamber adjacent to the next lower stake; that is to say, the initial driving stream in this case flows into the apparatus in a direction opposite to that taken by the initial driving stream in the apparatus shown in Figs. 3 and 4. The driving stream in each stage passes along the outside of the passage 35 by which the driven stream enters.

If Figs. 11 and 12 are assumed to represent a complete apparatus, the passage 49 near the left hand end of the figures will be the intake for the gas to be acted upon. This permits an inflow of gas to the combining chamber 46, this stream of gas being acted upon by a driving stream which raises its condition as regards energy per unit weight as the combined stream passes through the chamber. At the other end of this chamber 46 a portion of the gas passes through an outlet passage to the side pipe, which conducts it to the right hand end of the combining chamber 45 of the next higher stage, while the remainder of the combined stream from chamber 46 flows past the outlet passage to a discharge pipe 48.

The portion of the gas from chamber 46 which is conducted by the side pipe to chamber 45 is there acted upon by a driving stream and a part of the combined streams passes to chamber 46 to act as the driven stream, while the remainder is conducted by a side pipe to the right hand end of combining chamber 44. A similar action takes place in the other stages.

It will be seen that a portion of the gas taken out from chamber 46 to the side pipe and thence to chamber 45 is directly returned from the latter chamber to the former. A further part proceeds to higher stages some being directly returned to each stage from the adjacent higher stage so that the quantity of gas in each stage of the apparatus diminishes as we pass from left to right.

The arrangements of the inlet and outlet passages connecting with the side pipes in this apparatus may be any of those previously referred to. In the drawings arrangements similar to those shown in Figs. 3 and 4 are shown, the inlet and outlet passages being arranged in pairs, back to back. The members 53, 54 and 55 located near the two ends of the apparatus, only contain a single passage, this being an inlet passage in the case of members 53 and 55, and an outlet passage in the case of the member 54. The opposite ends of these members are tapered off so as to reduce the disturbance of the regular flow of the gases past them.

Apparatus as illustrated in Figs. 11 and 12 can be combined with apparatus as illustrated in Figs. 1 to 4. This may, for instance, be effected, as illustrated in Fig. 13, by providing a receiver 60 to which the pipe 25 of the apparatus shown in Fig. 1 and the passage 48 of the apparatus shown in Fig. 11 are both connected, while the outlet 56 beyond the chamber 9 of Fig. 1 is connected with the passage 49 of Fig. 11. The gas for use outside the injector apparatus is taken from the receiver by way of pipe 61 and will have a condition of energy per unit weight intermediate between that of the initial gaseous body taken in at 47 (Fig. 11) and that of the gaseous body injected into the chamber 1 (Fig. 1), the value of the condition of the output gaseous body depending on the number and proportions of the stages in each part of the apparatus. It is to be understood that the elements of the apparatus perform similar functions when used in combination as when used separately.

Any suitable gases including steam may be used for the initial driving stream, but it appears that it will be generally preferable to use gases resulting from the combustion of air and fuel. When it is desired to produce a gaseous body of this kind for use in injector apparatus in accordance with the present invention a combustion chamber is provided and this chamber can either be arranged so as to work by the explosion of charges of combustible mixture or may be arranged so as to work with continuous combustion. In the former case, illustrated in Fig. 14, a part of the charge produced by the explosion in the chamber 63 is taken to a receiver 64 from which it is led to the initial inlet pipe (25', Fig. 13) of the multi-stage injector apparatus (65, Fig. 13). The gases or gas and other material for the combustion may be sent into the chamber 63, Fig. 14, in two parts by separate pipes 66 and 67 provided with non-return valves 68 and 69 respectively. The mixture in the chamber is ignited by the spark plug 62 or other device. Valve gear is preferably provided between the explosion chamber 63 and the receiver 64 so that connection is cut off when the pressure has fallen below a certain amount. In the case illustrated an automatic valve 70 in the outlet passage 71 performs this function. The remaining gases in the explosion chamber can then be either utilized in a separate engine or may be led to other multi-stage apparatus, or to a lower stage or stages of the first mentioned apparatus, or may be simply exhausted. The passage 72 is provided for carrying off gases which do not pass the valve 70 and a mechanically operated valve 73 is arranged to open when the valve 70 closes.

A plant embodying the features set forth above is illustrated in Fig. 13. In this figure, in order to show the whole plant in a convenient manner, it has been necessary to use diagrammatical representation throughout. The tubular pipes are represented by single lines and each injector apparatus is shown by means of a central straight line with side lines connected therewith by curved portions at each end. The injector apparatus 74 is of the type illustrated in Fig. 1 and the injector apparatus 75 is the type illustrated in Fig. 11. There are also two other injector apparatus of the type illustrated in Fig. 1 and these are indicated by 65 and 76. The rectangular outlines indicate combustion chambers and the larger circles indicate reservoirs or receiving chambers. The smaller circles containing the crosses are symbols indicating automatic valves and the other crosses inserted on the pipes are intended to represent hand-operated stop valves. The reservoir 77 contains a supply of gaseous or liquid combustible which is sent through the pipes 78 and 79 to combustion chambers 63 and 80 respectively.

The combustion chamber 80 is intended to work with approximately constant pressure and in addition to the supply of gas there is a further gaseous current sent in through the inlet 81. These two currents mix in the chamber and are burned, the products of combustion issuing through the pipe 82. The main part of this stream of gas passes into the injector apparatus 75 which works in conjunction with the apparatus 74 and the receiver 60, as previously indicated. Atmospheric air is taken in at one end of the injector apparatus 74 and a body of gas at intermediate pressure is led into the receiver 60 and may be taken off therefrom by the pipe 61 for use in a turbine or other apparatus.

In order to prepare a charge of gas to be sent into the chamber 80 through the inlet 81 a portion of the contents of the receiver 60 is taken off through the pipe 83 and led into the injector apparatus 76 which receives its initial driving stream at $25^2$ through a branch 84 from the pipe 82. Since the gas resulting from the action of the injector 76 and leaving by way of the passage $56^2$ is of lower pressure than the gas in the chamber 80, it is necessary to have some additional arrangement for raising the pressure the necessary amount to cause this gas to pass into the chamber 80. This auxiliary apparatus consists of an injector 65 which receives initial driving stream from the combustion chamber 63 which has been previously described in connection with Fig. 14.

A part of the stream of gas from the passage $56^2$ is carried off by a pipe 85 to charge the receiver 86 and from this passes a pipe 66 into the chamber 63 when the valve 68, Fig. 14, is open. The high pressure gases which are sent into the receiver 64 as the result of the explosions which take place periodically in the chamber 63 are fed into the inlet pipe 25' of the injector 65 which also receives the main stream from the pipe 56² and delivers the resultant stream of gas through the pipe 87 to the receiver 88. The whole or part of the gas which leaves the combustion chamber 63 by way of the pipe 72 may be led into a lower stage or into several stages of one or other of the injector apparatus. A connection is indicated by way of example by a dotted line.

It is to be understood that in any of the forms of multi-stage injector apparatus above described gases can be taken off from or put into the apparatus at any stage, for instance by means of connections to the side passages. It may in such cases be desirable to alter the dimensions of the passages and chambers of the stage dealt with and of other stages adjacent thereto.

A plant constructed according to this invention may consist of a single series of chambers and injectors, such for instance as that illustrated in Fig. 1 or in Fig. 11, or two or more series may be combined to work in parallel. This latter arrangement appears to offer possible advantages where the combustion chamber works by explosion. Also, where the combustion chambers work by explosion it may be desirable to combine a number of combustion chambers with one or more receivers for the purpose of keeping more even the flow of the gases.

I declare that what I claim is:—

1. Multi-stage injector apparatus for imparting energy from one body of gaseous fluid to another, comprising a plurality of stages arranged in series and each having a combining chamber, inlet means for the driving stream of gas, inlet means for the driven stream of gas, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe into which the second portion of the gas is led, and means for leading the gas from the side pipe into one of the inlet means in another stage.

2. Multi-stage injector apparatus for imparting energy from one body of gaseous fluid to another comprising a plurality of stages arranged in series and each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for dividing the gas as it leaves the combining chamber into two parts and carrying these to different stages.

3. Multi-stage injector apparatus for imparting energy from one body of gaseous fluid to another, comprising a plurality of stages each having a combining chamber, inlet passages for the driving and driven streams, the walls of each of said passages being substantially parallel with the walls of the other passages in the neighborhood of the point of discharge so that the streams are sent into the combining chamber side by side in directions which lie parallel with each other, and outlet means for dividing the gas as it leaves the combining chamber into two parts and carrying them to different stages.

4. Multi-stage injector apparatus for imparting energy from one body of gaseous fluid to another, comprising a plurality of stages each having a combining chamber, means for causing a plurality of gas streams to flow side by side into the combining chamber in directions which lie parallel with each other, and outlet means for dividing the gas as it leaves the combining chamber into two parts and carrying them to different stages.

5. Multi-stage injector apparatus for imparting energy from one body of gaseous fluid to another, comprising a plurality of stages each having a combining chamber, inlet means for the driving stream of gas, inlet means for the driven stream of gas, means for guiding the streams in the chamber in directions which lie side by side without intersection, and outlet means for dividing the gas as it leaves the combining chamber into two parts and leading them to different stages.

6. Injector apparatus for imparting energy from one body of gaseous fluid to another, comprising a plurality of stages, each having a combining chamber, inlet passages for the driving and driven streams and outlet means for the body of gas resulting from the action in the stage, one of said stages having, in connection with the said outlet means, means for dividing the body of gas into two parts and means for conveying one of said parts to an inlet means of another stage, the parts of the said dividing means which lie adjacent the points at which the gas first encounters the said means having their surfaces parallel with the direction of flow in the chamber adjacent these points.

7. Injector apparatus for imparting energy from one body of gaseous fluid to another, comprising a plurality of stages, each having a combining chamber, inlet passages for the driving and driven streams and outlet means for the body of gas resulting from the action in the stage, one of said stages having the outlet means formed of a plurality of passages which have their walls, adjacent the points at which gas enters the passages, parallel with the direction of the gas flow in the chamber adjacent these points, one of the passages being curved laterally beyond the point at which the gas enters, a further passage member connected with said laterally curved part and means for connecting said passage member with the inlet means of one of the stages.

8. Injector apparatus for imparting energy from one body of gaseous fluid to another comprising a plurality of stages, each having a combining chamber, inlet passages for the driving and driven streams and outlet means for the body of gas resulting from the action in the stage, one of the stages having the walls of the inlet passages and the chamber forming means for guiding the streams into and through the chamber in directions which lie side by side without intersection, the said stage also having, in connection with the outlet means, means for dividing the gaseous body coming from the chamber into two parts and for leading them to different destinations.

9. Multi-stage injector apparatus for imparting energy from one body of gaseous fluid to another, comprising a plurality of stages each having a combining chamber, inlet means for the driving stream of gas, inlet means for the driven stream of gas, means for guiding the streams in the chamber in directions which lie side by side without intersection, means for leading part of the gas from the combining chamber forward directly into the inlet means of the next stage, and means for leading another part of the gas back to the inlet means of another stage, one of the parts of the gas serving as the driving stream and the other as the driven stream in the stages into which they are led.

10. Multi-stage injector apparatus for imparting energy from one body of gaseous fluid to another, comprising a plurality of stages each having a combining chamber, inlet passages for the driving and driven streams, the walls of each of said passages being substantially parallel with the walls of the other passages in the neighborhood of the point of discharge, means for leading part of the gas from the combining chamber forward directly into the inlet means of the next stage, and means for leading another part of the gas back to the inlet means of another stage, one of the parts of the gas serving as the driving stream and the other as the driven stream in the stages into which they are led.

11. Multi-stage injector apparatus for imparting energy from one body of gaseous fluid to another, comprising a plurality of stages each having a combining chamber, means for causing a plurality of gas streams to flow side by side into the combining chamber in directions which lie parallel with each other, means for guiding the streams in the chamber in directions which lie side by side without intersection, means for leading part of the gas from the combining chamber forward directly into the inlet means of the next stage, and means for leading another part of the gas back to the inlet means of another stage, one of the parts of the gas serving as the driving stream and the other as the driven stream in the stages into which they are led.

12. Multi-stage injector apparatus for imparting energy from one body of gaseous fluid to another, comprising a plurality of stages each having a combining chamber, inlet means for the driving stream of gas, inlet means for the driven stream of gas, means for guiding the streams in the chamber in directions which lie side by side without intersection, means for leading part of the gas from the combining chamber to one of the inlet means of the next chamber, means for leading another part out laterally, a side pipe into which the second portion of the gas is led, and means for leading the gas from the side pipe into one of the inlet means in another stage.

13. Multi-stage injector apparatus for imparting energy from one body of gaseous fluid to another, comprising a plurality of stages each having a combining chamber, inlet passages for the driving and driven streams, the walls of each of said passages being substantially parallel with the walls of the other passages in the neighborhood of the point of discharge, means for guiding the streams in the chamber in directions which lie side by side without intersection, means for leading part of the gas from the combining chamber to one of the inlet means of the next chamber, means for leading another part out laterally, a side pipe into which the second portion of the gas is led, and means for leading the gas from the side pipe into one of the inlet means in another stage.

14. Multi-stage injector apparatus for imparting energy from one body of gaseous fluid to another, comprising a plurality of stages each having a combining chamber, means for causing a plurality of gas streams to flow side by side into the combining chamber, in directions which lie parallel with each other, means for guiding the streams in the chamber in directions which lie side by side without intersection, means for leading part of the gas from the combining chamber to one of the inlet means of the next chamber, means for leading another part out laterally, a side pipe into which the second portion of the gas is led, and means for leading the gas from the side pipe into one of the inlet means in another stage.

15. Multi-stage injector apparatus for imparting energy from one body of gaseous fluid to another, comprising a plurality of stages each having a combining chamber, inlet means for the driving stream of gas, inlet means for the driven stream of gas, means for guiding the streams in the chamber in directions which lie side by side without intersection, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe into which the second portion of the gas is led, and means for leading the gas from the side pipe into one of the inlet means in another stage.

16. Multi-stage injector apparatus for imparting energy from one body of gaseous fluid to another, comprising a plurality of stages each having a combining chamber, inlet passages for the driving and driven streams, the walls of each of said passages being substantially parallel with the walls of the other passages in the neighborhood of the point of discharge, means for guiding the streams in the chamber in directions which lie side by side without intersection, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe into which the second portion of the gas is led, and means for leading the gas from the side pipe into one of the inlet means in another stage.

17. Multi-stage injector apparatus for imparting energy from one body of gaseous fluid to another, comprising a plurality of stages each having a combining chamber, inlet means for leading driving and driven streams of gas into said chamber, outlet means for leading part of the gas from the combining chamber forward directly into the inlet means of the next stage, and outlet means for leading another part of the gas from the combining chamber back to the inlet means of a preceding stage, the said outlet means having their walls adjacent the points at which the gas enters parallel with the direction of the gas flow in the chamber adjacent these points.

18. Multi-stage injector apparatus for imparting energy from one body of gaseous fluid to another, comprising a plurality of stages each having a combining chamber, inlet means for leading driving and driven streams of gas into said chamber, outlet means for dividing the gas leaving the combining chamber into two parts and leading them to different destinations, said outlet means having their walls adjacent the points at which the gas enters them parallel with the direction of the gas flow in the chamber adjacent these points.

19. Multi-stage injector apparatus for imparting energy from one body of gaseous fluid to another, comprising a plurality of stages each having a combining chamber, inlet means for the driving stream of gas, inlet means for the driven stream of gas, outlet means for dividing the gas leaving the combining chamber into two parts and leading these parts to different destinations, the inlet and outlet means having their walls in the neighborhood at which the gas enters and leaves the chamber parallel with the directions of gas flow in the chamber adjacent these points.

20. Multi-stage injector apparatus for imparting energy from one body of gaseous fluid to another, comprising a plurality of stages arranged in series and each having a combining chamber, side pipes adjacent said chamber, inlet means for leading driving and driven streams of gas into said chamber and outlet means leading the gas from said chamber in two portions, a curved passage joining one of said side pipes to one of said inlet means, a curved passage joining the other of said side pipes to one of said outlet means, one of the inlet means and one of the outlet means being formed by end portions connecting said curved passages with said chamber and having their walls directed parallel with the directions of gas flow in the adjacent parts of the chamber.

21. Multi-stage injector apparatus for imparting energy from one body of gaseous fluid to another, comprising a plurality of stages arranged in series and each having a combining chamber, side pipes adjacent said chamber, inlet means for leading driving and driven streams of gas into said chamber and outlet means leading the gas from said chamber in two portions, a laterally extending passage joining one of said outlets to one of said side pipes, a second laterally extending passage joining one of said inlets with the other of said side pipes, the lateral inlet connecting passage of one stage and the lateral outlet connecting passage of the next stage being arranged back to back.

22. Multi-stage injector apparatus for imparting energy from one body of gaseous fluid to another, comprising a plurality of stages arranged in series and each having a combining chamber, side pipes adjacent said chamber, inlet means for leading driving and driven streams of gas into said chamber and outlet means leading the gas from said chamber in two portions, a curved passage joining one of said side pipes to one of said inlet means, a curved passage joining the other of said side pipes to one of said outlet means, one of the inlet means and one of the outlet means being formed by end portions connecting said curved passages with said chamber and having their walls directed parallel with the directions of gas flow in the adjacent parts of the chamber, the said inlet means of one stage and the correspondingly formed outlet means of the next stage being arranged back to back.

23. Multi-stage injector apparatus for imparting energy from one body of gaseous fluid to another, comprising a plurality of stages arranged in series and each having a combining chamber, side pipes adjacent said chamber, inlet means for leading driving and driven streams of gas into said chamber and outlet means leading the gas from said chamber in two portions, a laterally extending passage joining one of said outlets to one of said side pipes, a second laterally extending portion joining one of said inlets with the other of said side pipes, the lateral inlet connecting passage of one stage and the lateral outlet connecting passage of the next stage being arranged back to back, the walls of said passages being shaped so as to unite to produce a continuous body without abrupt recesses or projections to disadvantageously affect the flow of gas past them from one stage to the next.

24. Multi-stage injector apparatus for imparting energy from one body of gaseous fluid to another, comprising a plurality of stages arranged in series and each having a combining chamber, side pipes adjacent said chamber, inlet means for leading driving and driven streams of gas into said chamber and outlet means leading the gas from said chamber in two portions, a curved passage joining one of said side pipes to one of said inlet means, a curved passage joining the other of said side pipes to one of said outlet means, one of the inlet means and one of the outlet means being formed by end portions connecting said curved passages with said chamber and having their walls directed parallel with the directions of gas flow in the adjacent parts of the chamber, the said inlet means of one stage and the correspondingly formed outlet means of the next stage being arranged back to back, the walls of said passages being shaped so as to unite to produce a continuous body without abrupt recesses or projections to disadvantageously affect the flow of gas past them from one stage to the next.

25. Multi-stage injector apparatus for imparting energy from one body of gaseous fluid to another, comprising a plurality of stages arranged in series and each having a combining chamber, inlet means for leading driving and driven streams of gas into said chamber, outlet means leading the gas from said chamber in two portions, a laterally extending passage connected with one of said outlets, a second laterally extending passage connected with one of said inlets, the lateral inlet passage of one stage and the lateral outlet passage of the next stage being arranged back to back.

26. Multi-stage injector apparatus for imparting energy from one body of gaseous fluid to another, comprising a plurality of stages arranged in series and each having a combining chamber, inlet means for leading driving and driven streams of gas into said chamber, outlet means leading the gas from said chamber in two portions, a laterally extending passage connected with one of said outlets, a second laterally extending passage connected with one of said inlets, the lateral inlet passage of one stage and the lateral outlet passage of the next stage being arranged back to back, the walls of said passages being shaped so as to unite to produce a continuous body without abrupt recesses or projections to disadvantageously affect the flow of gas past them from one stage to the next.

27. Injector apparatus for imparting energy from one body of gaseous fluid to another, comprising two stages arranged in series and each having a combining chamber and inlet and outlet passages, an outlet passage of the first stage being laterally directed and an inlet passage for the second stage being also laterally directed, the portions of these passages which lie adjacent the junction of the two stages being arranged back to back.

28. Injector apparatus for imparting energy from one body of gaseous fluid to another, comprising two stages arranged in series and each having a combining chamber and inlet and outlet passages, an outlet passage of the first stage being laterally directed and an inlet passage for the second stage being also laterally directed, the portions of these passages which lie adjacent the junction of the two stages being arranged back to back, the walls of said passages being shaped so as to unite to produce a continuous body without abrupt recesses or projections to disadvantageously affect the flow of gas past them from one stage to the next.

29. Multi-stage injector apparatus for imparting energy from one body of gaseous fluid to another, comprising a plurality of stages each having a combining chamber, inlet means for leading driving and driven streams of gas into said chamber, outlet means for dividing the gas leaving the combining chamber into two parts and leading them to different stages, said outlet means having their walls adjacent the points at which the gas enters them substantially parallel with the axis of the combining chamber.

30. Multi-stage injector apparatus for imparting energy from one body of gaseous fluid to another, comprising a plurality of stages each having a combining chamber, inlet means for the driving stream of gas, inlet means for the driven stream of gas, outlet means for dividing the gas leaving the combining chamber into two parts and leading these parts to different stages, the inlet and outlet means having their walls in the neighborhood at which the gas enters and leaves the chamber substantially parallel with the axis of the combining chamber.

31. Injector apparatus for transferring energy from one body of gaseous fluid to another, comprising a plurality of stages each having a combining chamber, a plurality of inlet passages at one end of said chamber, a plurality of outlet passages at the other end of said chamber, one of said inlet passages and one of said outlet passages being shaped in cross-section so as to have a dimension in one direction greater than the dimension in the direction at right-angles to the first, the said inlet passage being arranged with its longer dimension in a plane lying approximately at right-angles to that in which the longer dimension of the said outlet passage lies.

32. Injector apparatus for transferring energy from one body of gaseous fluid to another, comprising a plurality of stages each having a combining chamber, a plurality of inlet passages at one end of said chamber, a plurality of outlet passages at the other end of said chamber, one of said inlet passages and one of said outlet passages being shaped in cross-section so as to have a dimension in one direction greater than the dimension in the direction at right-angles to the first, the said inlet passage being arranged with its longer dimension in the plane lying approximately at right-angles to that in which the longer dimension of the said outlet passage lies, the said outlet passage of one stage being of similar shape to the inlet passage of the next stage, and the two being arranged back to back.

33. Injector apparatus for transferring energy from one body of gaseous fluid to another, comprising a plurality of stages each having a combining chamber, a plurality of inlet passages at one end of said chamber, a plurality of outlet passages at the other end of said chamber, one of said inlet passages and one of said outlet passages being of approximately rectangular shape in cross-section having one pair of sides of the rectangle greater than the other pair, the said inlet passage being arranged with its longer side in a plane lying approximately at right-angles to that in which the longer side of the said outlet passage lies.

34. Injector apparatus for transferring energy from one body of gaseous fluid to another, comprising a plurality of stages each having a combining chamber of approximately rectangular cross-section, a plurality of inlet passages at one end of said chamber, a plurality of outlet passages at the other end of said chamber, one of said inlet passages and one of said outlet passages being of approximately rectangular shape in cross-section having one pair of sides of the rectangle greater than the other pair, the said inlet passage being arranged with its longer side in a plane lying approximately at right-angles to that in which the longer side of the said outlet passage lies.

35. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form, each having one pair of sides greater than the other pair, said inlet and outlet passage each being arranged to extend from one wall of the chamber across the end of said chamber to the neighborhood of the opposite wall, leaving a space at the side to form another inlet and outlet.

36. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passages each being arranged to extend from one wall of the chamber across the end of said chamber to the neighborhood of the opposite wall, leaving a space at each side to serve for the passage of another body of gas.

37. Injector apparatus for tranferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passages each being arranged to extend from one wall of the chamber across the end of said chamber to meet the opposite wall, leaving spaces at each side to form other inlet and outlet passages.

38. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passages each being arranged to extend from one wall of the chamber across the end of said chamber to meet the opposite wall, leaving spaces at each side to form other inlet and outlet passages, the said outlet passage at one stage being of similar shape to the inlet passage of the next stage and the two being arranged back to back.

39. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passage each being arranged to extend from one wall of the chamber across the end of said chamber to meet the opposite wall, leaving spaces at each side to form other inlet and outlet passages, the said outlet passage at one stage being of similar shape to the inlet passage of the next stage and the two being arranged back to back, the walls of said passages being shaped so as to unite to produce a continuous body without abrupt recesses or projections to disadvantageously affect the flow of gas past them from one stage to the next.

40. Injector apparatus for transferring energy from one body of gaseous fluid to another, comprising a plurality of stages each having a combining chamber of approximately rectangular cross-section, a plurality of inlet passages at one end of said chamber, a plurality of outlet passages at the other end of said chamber, one of said inlet passages and one of said outlet passages being of approximately rectangular shape in cross-section having one pair of sides of the rectangle greater than the other pair.

41. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form, each having one pair of sides greater than the other pair, said inlet and outlet passage each being arranged to extend from one wall of the chamber across the end of said chamber to the neighborhood of the opposite wall, leaving a space at the side to form another inlet and outlet, the first mentioned inlet passage of a stage being arranged to extend from a side of the chamber which is at right-angles to that from which the similar outlet passage of the stage extends.

42. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passage each being arranged to extend from one wall of the chamber across the end of said chamber to the neighborhood of the opposite wall, leaving a space at each side to serve for the passage of another body of gas, the wall from which the said inlet passage of a stage extends being approximately at right-angles to that from which the said outlet passage extends.

43. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passage each being arranged to extend from one wall of the chamber across the end of said chamber to meet the opposite wall, leaving spaces at each side to form other inlet and outlet passages, the wall from which the said inlet passage of a stage extends being approximately at right-angles to that from which the said outlet passage extends.

44. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passage each being arranged to extend from one wall of the chamber across the end of said chamber to meet the opposite wall, leaving spaces at each side to form other inlet and outlet passages, the said outlet passage at one stage being of similar shape to the inlet passage of the next stage, the two being arranged back to back, and the said outlet passage of a stage being arranged across the chamber at right-angles to the inlet passage of the same stage.

45. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form each having one pair of sides greater than the other pair, said inlet and outlet passage each being arranged to extend from one wall of the chamber across the end of said chamber to meet the opposite wall, leaving spaces at each side to form other inlet and outlet passages, the said outlet passage of one stage being of similar shape to the inlet passage of the next stage, the two being arranged back to back, the walls of said passages being shaped so as to unite to produce a continuous body without abrupt recesses or projections to disadvantageously affect the flow of gas past them from one stage to the next, and the said outlet passage of a stage being arranged across the chamber at right-angles to the inlet passage of the same stage.

46. Injector apparatus for transferring energy from one body of gaseous fluid to another, comprising a combining chamber of approximately rectangular cross-section, means for guiding gas streams into one end of said chamber and out of the other end of said chamber, one of said means being a passage of approximately rectangular shape in cross-section having one side adjoining one of the sides of the chamber, the said passage being of smaller area in cross-section than the adjacent part of the combining chamber.

47. Injector apparatus for transferring energy from one body of gaseous fluid to another, comprising a combining chamber of an approximately rectangular shape in cross-section, means for guiding gas streams into one end of said chamber and out of the other, one of said means being a passage of approximately rectangular form arranged to extend from one wall of the chamber across the end of said chamber to meet the opposite wall, leaving spaces at each side to form other gas passages.

48. Injector apparatus for transferring energy from one body of gaseous fluid to another, comprising a plurality of stages each having a combining chamber of approximately rectangular cross-section, a plurality of inlet passages at one end of said chamber, a plurality of outlet passages at the other end of said chamber, one of said inlet passages and one of said outlet passages being of approximately rectangular shape in cross-section, side pipes adjacent said chamber, a lateral connecting member extending between said rectangular inlet passage and one of said pipes and a lateral connecting member extending from said rectangular outlet passage to the other of said side pipes.

49. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form, said inlet and outlet passage each being arranged to extend from one wall of the chamber across the end of said chamber to meet the opposite wall, leaving spaces at each side to form other inlet and outlet passages, the said outlet passage at one stage being of similar shape to the inlet passage of the next stage, the two being arranged back to back, side pipes adjacent said chamber, a lateral connecting passage between one of said side pipes and the central inlet passage, and a lateral connecting passage between the other of said side pipes and the central outlet passage.

50. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form, said inlet and outlet passage each being arranged to extend from one wall of the chamber across the end of said chamber to the neighborhood of the opposite wall, leaving a space at the side to form another inlet or outlet.

51. Injector apparatus for transferring energy from one body of gaseous fluid to another, comprising a plurality of stages each having a combining chamber of approximately rectangular shape in cross-section, an inlet passage at one end of said chamber, an outlet passage at the other end of said chamber, said passages being of approximately rectangular form, said inlet and outlet passage each being arranged to extend from one wall of the chamber across the end of said chamber to meet the opposite wall, leaving spaces at each side to form other inlet and outlet passages.

52. Multi-stage injector apparatus for imparting energy from one body of gaseous fluid to another, comprising a plurality of stages arranged in series, an inlet for a stream of gas in a condition of relatively high energy per unit weight at one end stage, and an inlet for a stream of gas of relatively low energy contents per unit weight at the other end stage, an outlet for a gaseous stream resulting from the action of the apparatus; stages between the two end ones each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for dividing the gas as it leaves the combining chamber into two parts and carrying these to different stages.

53. Multi-stage injector apparatus for imparting energy from one body of gaseous fluid to another, comprising a plurality of stages arranged in series, an inlet for a stream of gas in a condition of relatively high energy contents per unit weight at one end stage and an inlet for a stream of gas of relatively low energy per unit weight at the other end stage, an outlet for a gaseous stream resulting from the action of the apparatus; stages between the two end ones each having a combining chamber, inlet means for the driving stream of gas, inlet means for the driven stream of gas, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe into which the second portion of the gas is led, and means for leading the gas from the side pipe into one of the inlet means in another stage.

54. Multi-stage injector apparatus for imparting energy from one body of gaseous fluid to another, comprising a plurality of stages arranged in series, an inlet for a stream of gas in a condition of relatively high energy contents per unit weight at one end stage and an inlet for a stream of gas of relatively low energy per unit weight at the other end stage, an outlet for a gaseous stream resulting from the action of the apparatus; stages between the two end ones each having a combining chamber, inlet means for the driving stream of gas, inlet means for the driven stream of gas, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe extending along two stages and connecting at one end with the inlet end of the combining chamber of one stage and at the other end with the outlet end of the combining chamber of the next stage receiving the second portion of the gas from the outlet of one stage and conveying it to the inlet means of the other stage.

55. Multi-stage injector apparatus for imparting energy from one body of gaseous fluid to another, comprising a plurality of stages arranged in series, an inlet for a stream of gas in a condition of relatively high energy contents per unit weight at one end stage and an inlet for a stream of gas of relatively low energy per unit weight at the other end stage, an outlet for a gaseous stream resulting from the action of the apparatus; stages between the two end ones each having a combining chamber, means for causing a plurality of gas streams to flow side by side into the combining chamber in directions which lie parallel with each other, and outlet means for dividing the gas as it leaves the combining chamber into two parts and carrying them to different stages.

56. Multi-stage injector apparatus for imparting energy from one body of gaseous fluid to another, comprising in combination two sets of stages, the stages of each set being arranged in series, each set having an inlet for a stream of gas in a condition of relatively high energy per unit weight at one end stage and an inlet for a stream of gas of relatively low energy contents per unit weight at the other end stage; stages between the two end ones of each set each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for dividing the gas as it leaves the combining chamber into two parts and carrying these to different stages; connecting means between the highest stage of one set and the lowest stage of the other set, and outlet means located on said connecting means for permitting the outflow of the gaseous body resulting from the action of the apparatus.

57. Multi-stage injector apparatus for imparting energy from one body of gaseous fluid to another, comprising in combination two sets of stages, the stages of each set being arranged in series, each set having an inlet for a stream of gas in a condition of relatively high energy per unit weight at one end stage and an inlet for a stream of gas of relatively low energy contents per unit weight at the other end stage; stages between the two end ones of each set each having a combining chamber, inlet means for the driving stream of gas, inlet means for the driven stream of gas, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe extending along two stages and connecting at one end with the inlet end of the combining chamber of one stage and at the other end with the outlet end of the combining chamber of the next stage, said pipe receiving the second portion of the gas from the outlet of one stage and conveying it to the inlet means of the other stage; connecting means between the highest stage of one set and the lowest stage of the other set, and outlet means located on said connecting means for permitting the outflow of the gaseous body resulting from the action of the apparatus.

58. Multi-stage injector apparatus for imparting energy from one body of gaseous fluid to another, comprising in combination two sets of stages, the stages of each set being arranged in series, each set having an inlet for a stream of gas in a condition of relatively high energy per unit weight at one end stage and an inlet for a stream of gas of relatively low energy contents per unit weight at the other end stage; stages between the two end ones of each set each having a combining chamber, means for causing a plurality of gas streams to flow side by side into the combining chamber in directions which lie parallel with each other, and outlet means for dividing the gas as it leaves the combining chamber into two parts and carrying them to different stages; connecting means between the highest stage of one set and the lowest stage of the other set, and outlet means located on said connecting means for permitting the outflow of a gaseous body resulting from the action of the apparatus.

59. Multi-stage injector apparatus for imparting energy from one body of gaseous fluid to another, comprising in combination two sets of stages, the stages of each set being arranged in series each set having an inlet for a stream of gas in a condition of relatively high energy per unit weight at one end stage and an inlet for a stream of gas of relatively low energy contents per unit weight at the other end stage; connecting means between the highest stage of one set and the lowest stage of the other set, and outlet means located on said connecting means for permitting the outflow of the gaseous body resulting from the action of the apparatus.

60. Apparatus for imparting energy from one body of gaseous fluid to another, comprising a multi-stage injector having means for taking in at one end stage a stream of gas of relatively low energy contents per unit weight, and having at the other end stage means for leading in a stream of gas of higher energy contents per unit weight and for delivering a stream of gas resulting from the interaction of the two streams and having a condition of energy per unit weight near to that of the second stream; a second multi-stage injector having means for leading in at one end stage a stream of gas of relatively high energy contents per unit weight and having at the other end stage means for taking in a stream of gas of lower energy contents per unit weight and means for delivering a stream of gas resulting from the interaction of said streams and having a condition of energy per unit weight near to that of the second stream; connecting means between the higher energy end stage of the first injector and the lower energy end stage of the second injector, and means located on said connecting means for delivering a stream of gas resulting from the action of the combined apparatus.

61. Apparatus for imparting energy from one body of gaseous fluid to another, comprising multi-stage injector means for producing interaction between a stream of gas of relatively low energy contents per unit weight and another stream of gas of higher energy contents per unit weight and delivering as the result of the interaction a body of gas having a condition of energy per unit weight near to that of the second stream; a second multi-stage injector means for producing interaction between a stream of gas of relatively high energy contents per unit weight and a second stream of lower energy contents per unit weight delivering as the result of the interaction a body of gas having a condition of energy per unit weight near to that of the second stream; connecting means between the higher energy end of the first injector means and the lower energy end of the second means, and means located on said connecting means for delivering a stream of gas resulting from the action of the combined apparatus.

62. Apparatus for imparting energy from one body of gaseous fluid to another, comprising a multi-stage injector having means for taking in a stream of gas of relatively low energy contents per unit weight and means for leading in a stream of gas of higher energy contents per unit weight, and means for delivering a stream of gas resulting from the inter-action of the two streams and having a condition of energy per unit weight near to that of the second stream; a second multi-stage injector having means for leading in a stream of gas of relatively high energy contents per unit weight, and means for taking in a stream of gas of lower energy contents per unit weight, and means for delivering a stream of gas resulting from the interaction of said streams and having a condition of energy per unit weight near to that of the second stream; connecting means between the delivery means of the first injector and the second intake means of the second injector, connecting means between the delivery means of the second injector and the second intake means of the first injector, and means located on one of said connecting means for delivering a stream of gas resulting from the action of the combined apparatus.

63. Apparatus for imparting energy from one body of gaseous fluid to another, comprising a multi-stage injector having means for taking in a stream of gas of relatively low energy contents per unit weight and means for leading in a stream of gas of higher energy per unit weight, and means for delivering a stream of gas resulting from the inter-action of the two streams and having a condition of energy per unit weight near to that of the second stream; a second multi-stage injector having means for leading in a stream of gas of relatively high energy contents per unit weight and means for taking in a stream of gas of lower energy contents per unit weight, and means for delivering a stream of gas resulting from the interaction of said streams and having a condition of energy per unit weight near to that of the second stream; connecting means between the delivery means of the first injector and the second intake means of the second injector, connecting means between the delivery means of the second injector and the second intake means of the first injector, a receiving chamber forming part of the second of said connecting means, and an outlet on said receiver for delivering gas resulting from the action of the combined apparatus.

64. Apparatus for imparting energy from one body of gaseous fluid to another, comprising two multi-stage injectors each having means for taking in two streams of gas of different energy contents per unit weight, and means for delivering a stream of gas resulting from the action of the two streams; connecting means between the delivery means of each injector and one of the intake means of the other injector; a receiver located on one of said connecting means, outlet means connected with said receiver for delivering gas resulting from the action of the combined apparatus.

65. Multi-stage injector apparatus for imparting energy from one body of gaseous fluid to another, comprising a plurality of stages arranged in series and each having a combining chamber, two laterally extending members, one entering each end of the chamber, serving as inlet and outlet passages, side pipes adjacent said chambers each side pipe connecting with a lateral inlet member of one stage and a lateral outlet member of another stage, other inlet and outlet passages arranged at the side of the said inlet and outlet passages, the laterally extending inlet member serving for supplying the driving stream for each stage, the axial inlet passage of one end stage serving to admit the initial driven stream of relatively low energy contents per unit weight, the lateral inlet of the other end stage serving to admit the initial driving stream of relatively high energy contents per unit weight and the axial outlet at the end of this stage serving for the outflow of the resultant body of gas produced by the interaction of the streams in the apparatus.

66. Multi-stage injector apparatus for imparting energy from one body of gaseous fluid to another, comprising a plurality of stages arranged in series and each having a combining chamber, two laterally extending members, one entering each end of the chamber, serving as inlet and outlet passages, side pipes adjacent said chambers each side pipe connecting with a lateral inlet member of one stage and a lateral outlet member of another stage, other inlet and outlet passages arranged at the side of the said inlet and outlet passages, the laterally extending inlet member serving for supplying the driving stream for each stage, the axial inlet passage of one end stage being in communication with the atmosphere and serving to admit the initial driven stream therefrom, the lateral outlet passage of this stage being also in communication with the atmosphere and serving as the exhaust passage for the apparatus, the lateral inlet of the other end stage serving to admit the initial driving stream of relatively high energy per unit weight, and the axial outlet at the end of this stage serving for the outflow of the resultant body of gas produced by the interaction of the streams in the apparatus.

67. Apparatus for imparting energy from one body of gaseous fluid to another, comprising a multi-stage injector the stages of which are arranged in series and each have a combining chamber, two laterally extending members, one entering each end of the chamber, serving as inlet and outlet passages, side pipes adjacent said chambers each side pipe connecting with a lateral inlet member of one stage and a lateral outlet member of another stage, other inlet and outlet passages arranged at the side of the said inlet and outlet passages, the laterally extending inlet member serving for supplying the driving stream for each stage, the axial inlet passage of one end stage serving to admit the initial driven stream of relatively low energy contents per unit weight, the lateral inlet of the other end stage serving to admit the initial driving stream of higher energy contents per unit weight and the axial outlet at the end of this stage serving for the outflow of the resultant body of gas produced by the interaction of the streams in the apparatus, a second multi-stage injector, connecting means between the second mentioned end stage of said first injector and one end stage of the second injector, and means for taking out gas from one of said connecting means; the second injector acting as means for producing interaction between a stream of gas of relatively high energy contents per unit weight and a stream of gas of lower energy contents per unit weight producing from the interaction a body of gas of a condition of energy per unit weight near to that of the second stream.

68. Apparatus for imparting energy from one body of gaseous fluid to another, comprising a multi-stage injector, the stages of which are arranged in series and each have a combining chamber, two laterally extending members, one entering each end of the chamber, serving as inlet and outlet passages, side pipes adjacent said chambers each side pipe connecting with a lateral inlet member of one stage and a lateral outlet member of another stage, other inlet and outlet passages arranged at the side of the said inlet and outlet passages, the laterally extending inlet member serving for supplying the driving stream for each stage, the axial inlet passage of one end stage serving to admit the initial driven stream of relatively low energy contents per unit weight, the lateral inlet of the other end stage serving to admit the initial driving stream of higher energy contents per unit weight and the axial outlet at the end of this stage serving for the outflow of the resultant body of gas produced by the interaction of the streams in the apparatus; a second multi-stage injector the stages of which are arranged in series and each have a combining chamber, two laterally extending members serving as inlet and outlet passages, side pipes adjacent said chamber each side pipe connecting with a lateral inlet member of one stage and a lateral outlet member of another stage, other inlet and outlet passages arranged at the side of said inlet and outlet passages, the laterally extending member serving for supplying the driven stream for each stage, the axial inlet passage of one end stage serving to admit the initial driving stream of gas of a relatively high energy contents per unit weight, the lateral inlet of the other end stage serving to admit the initial driven stream of lower energy contents per unit weight and the axial outlet at the end of this stage serving for the outflow of the resultant body of gas produced by the interaction of the streams in the apparatus; connecting means between the said inlet and outlet members of the second mentioned end stages of each injector, and an outlet member on one of said connecting means permitting the outflow of a body of gas resulting from the action of the combined apparatus.

69. Apparatus for imparting energy from one body of gaseous fluid to another, comprising a multi-stage injector acting as means for producing interaction between a body of gas of relatively high energy contents per unit weight and a body of gas of lower energy contents per unit weight, producing from the interaction a body of gas of a condition of energy per unit weight near to that of the first stream; a second multi-stage injector, the stages of which are arranged in series and each have a combining chamber, two laterally extending members serving as inlet and outlet passages, side pipes adjacent said chamber, each side pipe connecting with a lateral inlet member of one stage and a lateral outlet member of another stage, other inlet and outlet passages arranged at the side of said inlet and outlet passages, the laterally extending member serving for supplying the driven stream for each stage, the axial inlet passage of one end stage serving to admit the initial driving stream of gas of relatively high energy contents per unit weight, the lateral inlet of the other end stage serving to admit the initial driven stream of lower energy contents per unit weight and the axial outlet at the end of this stage serving for the outflow of the resultant body of gas produced by the interaction of the streams in the apparatus; connecting means between one end stage of the first injector and the second mentioned end stage of the second injector, and an outlet member on one of said connecting means permitting the outflow of a body of gas resulting from the action of the combined apparatus.

70. Multi-stage injector apparatus, comprising a principal tubular member, a plurality of subsidiary tubular members arranged alongside of said principal member, lateral tubular members extending from said subsidiary tubular members to the principal member and projecting into this latter, the projecting parts being arranged in pairs back to back and being spaced at intervals along the principal tubular member, serving to divide this member into a series of stages, each stage having a combining chamber formed of the part of the principal tubular member lying between adjacent pairs of said projecting parts, initial inlet members in the two end stages, and an outlet member for delivering the product of the injector action.

71. Apparatus for imparting energy from one body of gaseous fluid to another, comprising in combination a combustion chamber, an injector comprising a plurality of stages arranged in series, a gas inlet at one end stage of said injector, a connection between said inlet and said combustion chamber, an inlet for a body of gas at the other end stage, an outlet for a gaseous body resulting from the action of the apparatus; the stages of the injector between the two end ones each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for dividing the gas as it leaves the combining chamber into two parts and carrying these to different stages.

72. Apparatus for imparting energy from one body of gaseous fluid to another, comprising in combination a combustion chamber, an injector comprising a plurality of stages arranged in series, a gas inlet at one end stage of said injector, a connection between said inlet and said combustion chamber, an inlet for a body of gas at the other end stage, an outlet for a gaseous body resulting from the action of the apparatus; the stages of the injector between the two end ones each having a combining chamber, inlet means for the driving stream of gas, inlet means for the driven stream of gas, means for leading part of the gas from the combining chamber to one of the inlet means of the next chamber, means for leading another part out laterally, said means having the form of a passage parallel at the point at which the gas enters it with the direction of flow of the gas in the chamber adjacent this point, a side pipe into which the second portion of the gas is led, and means for leading the gas from the side pipe into one of the inlet means in another stage.

73. Apparatus for imparting energy from one body of gaseous fluid to another, comprising in combination a combustion chamber, an injector comprising a plurality of stages arranged in series, a gas inlet at one end stage of said injector, a connection between said inlet and said combustion chamber, an inlet for a body of gas at the other end stage, an outlet for a gaseous body resulting from the action of the apparatus; the stages of the injector between the two end ones each having a combining chamber, means for causing a plurality of gas streams to flow side by side into the combining chamber in directions which lie parallel with each other, and outlet means for dividing the gas as it leaves the combining chamber into two parts and carrying them to different stages.

74. Apparatus for imparting energy from one body of gaseous fluid to another, comprising a combustion chamber, an injector comprising a plurality of stages arranged in series and each having a combining chamber, two laterally extending members, one entering each end of the chamber, serving as inlet and outlet passages, side pipes adjacent said chambers each side pipe connecting with a lateral inlet member of one stage and a lateral outlet member of another stage, other inlet and outlet passages arranged at the side of the said inlet and outlet passages, the laterally extending inlet member serving for supplying the driving stream for each stage, a connecting member between the lateral inlet passage of one end stage and the combustion chamber serving to bring the driving stream from said combustion chamber to said inlet, the axial inlet passage of the other end stage serving to admit the initial driven stream and the axial outlet at the end of the first mentioned end stage serving for the outflow of the resultant body of gas produced by the interaction of the streams in the apparatus.

75. Apparatus for imparting energy from one body of gaseous fluid to another, comprising a combustion chamber, an injector comprising a plurality of stages arranged in series and each having a combining chamber, two laterally extending members, one entering each end of the chamber, serving as inlet and outlet passages, side pipes adjacent said chambers each side pipe connecting with a lateral inlet member of one stage and a lateral outlet member of another stage, other inlet and outlet passages arranged at the side of the said inlet and outlet passages, the laterally extending inlet member serving for supplying the driving stream for each stage, the axial inlet passage of one end stage being in communication with the atmosphere and serving to admit the initial driven stream therefrom, the lateral outlet passage of this stage being also in communication with the atmosphere and serving as the exhaust passage for the apparatus, a connecting member between the lateral inlet of the other end stage and the combustion chamber serving to lead a stream of gas from said chamber into the injector to serve as the initial driving stream, the axial outlet at the end of this stage serving for the outflow of the resultant body of gas produced by the interaction of the streams in the apparatus.

76. Apparatus for imparting energy from one body of gaseous fluid to another, comprising in combination a combustion chamber; a multi-stage injector comprising two sets of stages, the stages of each set being arranged in series, each set having an inlet for a stream of gas in a condition of relatively high energy per unit weight at one end stage and an inlet for a stream of gas of relatively low energy contents per unit weight at the other end stage, connecting means between the first mentioned inlet of one set of stages and the combustion chamber; stages between the two end ones of each set, each having a combining chamber, inlet means for the driving stream of gas, inlet means for the driven stream of gas, the inlets and the chamber walls acting as means for causing the streams to flow side by side in directions which lie parallel with each other into and in the chamber, and outlet means for dividing the gas as it leaves the combining chamber into two parts and carrying these to different stages; connecting means between the highest stage of one set and the lowest stage of the other set, and outlet means located on said connecting means for permitting the outflow of the gaseous body resulting from the action of the apparatus.

77. Apparatus for imparting energy from one body of gaseous fluid to another, comprising in combination a combustion chamber; a multi-stage injector comprising two sets of stages, the stages of each set being arranged in series, each set having an inlet for a stream of gas in a condition of relatively high energy per unit weight at one end stage and an inlet for a stream of gas of relatively low energy contents per unit weight at the other end stage; connecting means between the first mentioned inlet of one set of stages and the combustion chamber; connecting means between the highest stage of one set and the lowest stage of the other set, and outlet means located on said connecting means for permitting the outflow of the gaseous body resulting from the action of the apparatus.

78. Apparatus for imparting energy from one body of gaseous fluid to another, comprising a combustion chamber; a multi-stage injector connected with said combustion chamber and having means for leading in at one end stage a stream of gas therefrom and having at the other end stage means for taking in a stream of gas of lower energy contents per unit weight and means for delivering a stream of gas resulting from the interaction of said streams and having a condition of energy per unit weight near to that of the second stream; a second multi-stage injector having means for taking in at one end stage a stream of gas or relatively low energy per unit weight and having at the other end stage means for leading in a stream of gas of higher energy contents per unit weight and for delivering a stream of gas resulting from the interaction of the two streams and having a condition of energy per unit weight near to that of the second stream; connecting means between the second mentioned end stage of the second injector and the second mentioned end stage of the first injector, and means located on said connecting means for delivering a stream of gas resulting from the action of the combined apparatus.

79. Apparatus for imparting energy from one body of gaseous fluid to another, comprising a combustion chamber; an injector comprising a plurality of stages arranged in series and each having a combining chamber, two laterally extending members serving as inlet and outlet passages, side pipes adjacent said chamber each side pipe connecting with a lateral inlet member of one stage and a lateral outlet member of another stage, other inlet and outlet passages arranged at the side of said inlet and outlet passages, the laterally extending member serving for supplying the driven stream for each stage; connecting means between the axial inlet passage of one end stage and the combustion chamber, serving to admit the initial driving stream of gas, the lateral inlet of the other end stage serving to admit the initial driven stream of lower energy contents per unit weight, and the axial outlet at the end of this stage serving for the outflow of the resultant body of gas produced by the interaction of the streams in the apparatus.

80. Apparatus for imparting energy from one body of gaseous fluid to another, comprising a combustion chamber; multi-stage injector means for producing interaction between a stream of gas of relatively low energy contents per unit weight and another stream of gas of higher energy contents per unit weight and delivering as the result of the interaction a body of gas having a condition of energy per unit weight near to that of the second stream; a second multi-stage injector means for producing interaction between a stream of gas of relatively high energy contents per unit weight and a second stream of lower energy contents per unit weight delivering as the result of the interaction a body of gas having a condition of energy per unit weight near to that of the second stream; connecting means between the higher energy end of the first injector means and the lower energy end of the second means, means located on said connecting means for taking out a stream of gas resulting from the action of the apparatus and leading it to the combustion chamber, and means for delivering the gaseous body resulting from the combustion to the second multi-stage injector means.

81. Apparatus for imparting energy from one body of gaseous fluid to another, comprising a combustion chamber, injector means connected with said chamber for transferring energy from the products of combustion to another gaseous body and for charging the chamber with a gaseous body resulting from the said operation.

82. Apparatus for imparting energy from one body of gaseous fluid to another, comprising a combustion chamber, injector means connected with said chamber for transferring energy from the products of combustion to another gaseous body and for charging the chamber with a gaseous body resulting from the injector action, and auxiliary means for operating on the charge of gas to impart additional energy to it to cause it to enter the combustion chamber.

83. Apparatus for imparting energy from one body of gaseous fluid to another, comprising a combustion chamber, injector means connected with said chamber for transferring energy from the products of combustion to another gaseous body and for charging the chamber with a gaseous body resulting from the injector action, and auxiliary injector means for operating on the charge of gas to impart additional energy to it to cause it to enter the combustion chamber.

84. Apparatus for imparting energy from one body of gaseous fluid to another, comprising a combustion chamber, injector means connected with said chamber for transferring energy from the products of combustion to another gaseous body and for charging the chamber with a gaseous body resulting from the injector action, auxiliary injector means for operating on the charge of gas to impart additional energy to it to cause it to enter the combustion chamber, and a second combustion chamber connected with said auxiliary injector means and supplying the initial driving stream therefor.

85. Apparatus for imparting energy from one body of gaseous fluid to another, comprising a combustion chamber working at approximately constant pressure, injector means connected with said chamber for transferring energy from the products of combustion to another gaseous body resulting from the injector action, and auxiliary means for operating on the charge of gas to impart additional energy to it to cause it to enter the combustion chamber.

86. Apparatus for imparting energy from one body of gaseous fluid to another, comprising a combustion chamber working at approximately constant pressure, injector means connected with said chamber for transferring energy from the products of combustion to another gaseous body and for charging the chamber with a gaseous body resulting from the injector action, and auxiliary injector means for operating on the charge of gas to impart additional energy to it to cause it to enter the combustion chamber.

87. Apparatus for imparting energy from one body of gaseous fluid to another, comprising a combustion chamber working at approximately constant pressure, injector means connected with said chamber for transferring energy from the products of combustion to another gaseous body and for charging the chamber with a gaseous body resulting from the injector action, auxiliary injector means for operating on the charge of gas to impart additional energy to it to cause it to enter the combustion chamber, and a second combustion chamber connected with said auxiliary injector means and supplying the initial driving stream therefor.

88. Apparatus for imparting energy from one body of gaseous fluid to another, comprising a combustion chamber working at approximately constant pressure, injector means connected with said chamber for transferring energy from the products of combustion to another gaseous body and for charging the chamber with a gaseous body resulting from the injector action, auxiliary injector means for operating on the charge of gas to impart additional energy to it to cause it to enter the combustion chamber, and a second combustion chamber working with varying pressure connected with said auxiliary injector means supplying the initial driving stream therefor.

89. Apparatus for imparting energy from one body of gaseous fluid to another, comprising a combustion chamber working at approximately constant pressure, injector means connected with said chamber for transferring energy from the products of combustion to another gaseous body and for charging the chamber with a gaseous body resulting from the injector action, auxiliary injector means for operating on the charge of gas to impart additional energy to it to cause it to enter the combustion chamber, a second combustion chamber working with varying pressure connected with said auxiliary injector means supplying the initial driving stream therefor, and a receiver inserted between the second combustion chamber and the auxiliary injector means.

90. Apparatus for imparting energy from one body of gaseous fluid to another, comprising a combustion chamber working with varying pressure, means for supplying combustible materials to said chamber, a receiving chamber, means for leading the gaseous products of combustion from said combustion chamber to said receiving chamber, injector means for transferring energy from one body of gaseous fluid to another and means for leading gas from said receiving chamber to said injector means.

91. Apparatus for imparting energy from one body of gaseous fluid to another, comprising a combustion chamber working with varying pressure, means for supplying combustible materials to said chamber, a receiving chamber, means for leading the gaseous products of combustion from said combustion chamber to said receiving chamber, valve means arranged in the last mentioned means for cutting off the flow of gas when the pressure in the combustion chamber falls below a given value, injector means for transferring energy from one body of gaseous fluid to another and means for leading gas from said receiving chamber to said injector means.

92. Apparatus for imparting energy from one body of gaseous fluid to another, comprising a combustion chamber working at approximately constant pressure, injector means connected with said chamber for transferring energy from the products of combustion to another gaseous body and for charging the chamber with a gaseous body resulting from the injector action, auxiliary injector means for operating on the charge of gas to impart additional energy to it to cause it to enter the combustion chamber, a second combustion chamber working with varying pressure connected with said auxiliary injector means and supplying the initial driving stream therefor, a receiver inserted between the second combustion chamber and the auxiliary injector means, and valve means inserted between the second combustion chamber and the receiver for cutting off the flow of gas when the pressure in the combustion chamber falls below a given value.

93. Apparatus for imparting energy from one body of gaseous fluid to another, comprising a combustion chamber working with varying pressure, means for supplying combustible materials to said chamber, a receiving chamber, means for leading the gaseous products of combustion from said combustion chamber to said receiving chamber, valve means arranged in the last mentioned means for cutting off the flow of gas when the pressure in the combustion chamber falls below a given value, means for diverting the flow of gas from the combustion chamber into another course when said valve means closes, injector means for transferring energy from one body of gaseous fluid to another and means for leading gas from said chamber to said injector means.

94. Apparatus for imparting energy from one body of gaseous fluid to another, comprising a combustion chamber working at approximately constant pressure, injector means connected with said chamber for transferring energy from the products of combustion to another gaseous body and for charging the chamber with a gaseous body resulting from the injector action, auxiliary injector means for operating on the charge of gas to impart additional energy to it to cause it to enter the combustion chamber; a second combustion chamber working with varying pressure connected with said auxiliary injector means supplying the initial driving stream therefor, a receiver inserted between the second combustion chamber and the auxiliary injector means, valve means inserted between the second combustion chamber and the receiver for cutting off the flow of gas when the pressure in the combustion chamber falls below a given value, and means for diverting the flow of gas from the combustion chamber into another course when said valve means closes.

95. A method of imparting energy from one body of gaseous fluid to another in a plurality of stages consisting in the employment of a stage action as follows:—leading a stream of gas of relatively high energy contents per unit weight, in a predetermined path, leading a second stream of gas of lower energy per unit weight, in a path parallel with that of the first stream and such that the adjacent surfaces of the two streams are in contact with each other, dividing the compound stream into two parts, and leading these parts in gradually diverging paths, bringing one of the parts to another stage and leading it into said stage as one of the primary streams.

96. A method of imparting energy from one body of gaseous fluid to another in a plurality of stages consisting in the employment of a stage action as follows:—leading a stream of gas of relatively high energy contents per unit weight, in a predetermined path, leading a second stream of gas of lower energy per unit weight, in a path parallel with that of the first stream and such that the adjacent surfaces of the two streams are in contact with each other, dividing the compound stream into two parts, and leading these parts in gradually diverging paths, bringing one of the parts to another stage and leading it into said stage as the more highly energized primary stream, and bringing the other of the said parts to a third stage, leading it into said stage as the less highly energized primary stream.

In witness whereof, I have hereunto signed my name April 1912, in the presence of two subscribing witnesses.

J. A. HART.

Witnesses:
 RICHD. L. CLEAVER,
 CHARLES McCALLUM.